Patented Sept. 24, 1946

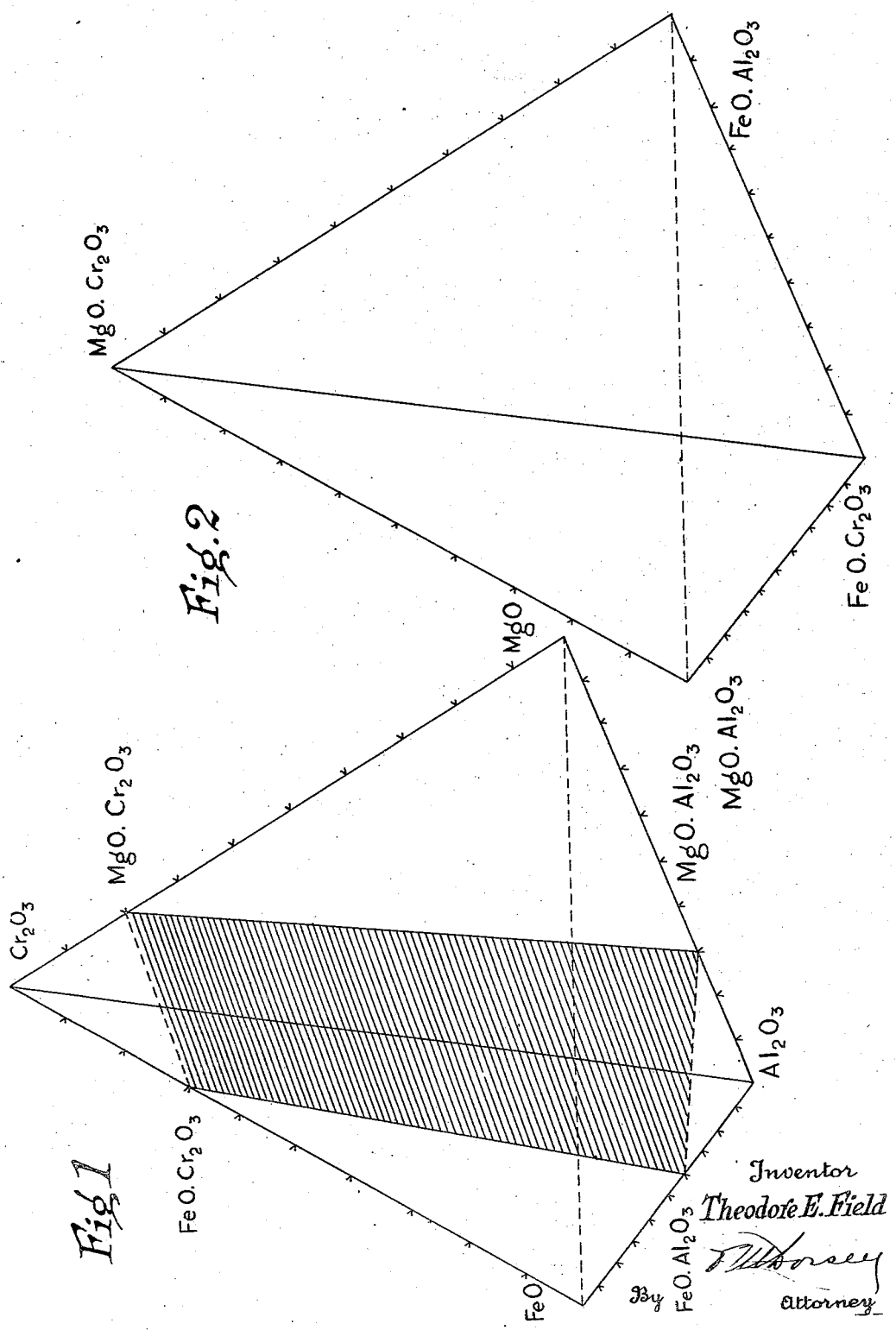

2,408,305

UNITED STATES PATENT OFFICE 2,408,305

CAST REFRACTORY PRODUCT

Theodore Estes Field, Louisville, Ky., assignor to Corhart Refractories Company, Louisville, Ky., a corporation of Delaware Application August 1, 1944, Serial No. 547,565

6 Claims. (Cl. 106—59)

This invention relates to a novel heat cast chromite refractory, which is particularly suitable for use at high temperatures in contact with slags high in iron oxide. By heat cast is meant the complete melting as for example with the techniques disclosed in U. S. Patent #1,615,750 to Fulcher, and shaping into the desired form by casting into molds and solidifying.

The extensive use of electric furnaces for melting alloy steels has created new refractory problems since the slags which are preferred may be quite different from the traditional high alkaline earth slags of the blast furnace and the open hearth. The slag in an electric furnace melting chrome steel commercially for example analysed roughly 72% FeO, 16% $Al_2O_3$, 4% $Cr_2O_3$, 6% $SiO_2$ and only 2% CaO and MgO, and such a slag has been used for test purposes on the novel refractories disclosed below. In such a furnace, attack on the refractories is partly chemical corrosion and partly mechanical erosion. I have found that a heat cast refractory is particularly advantageous where erosion is a factor since the crystals in forming on solidification apparently interlock and at any rate give a strongly coherent body even when reheated above the softening temperature of the amorphous matrix associated with such refractories. This matrix replaces both the porosity and the fluxing bond of the burnt refractory and since it is in substantial equilibrium with the crystals it is not appreciably corrosive on these crystals as the temperature is increased and on the other hand by its substitution for porosity prevents ready access of slags which are corrosive into the body of the refractory.

In my U. S. Patent 2,271,363 I have disclosed a heat cast refractory consisting of $FeO.Cr_2O_3$, to be made from pure materials since this was developed for use against commercial glasses where the presence of $SiO_2$ or MgO and $Al_2O_3$ together is harmful. I have found that pure $FeO.Cr_2O_3$ is excellent in chemical resistance to high FeO slags also but the high $Cr_2O_3$ content (68%) and the cost of pure materials is a drawback to general commercial use. Also expensive and even higher in $Cr_2O_3$ content (79%) is pure $MgO.Cr_2O_3$ as disclosed in my U. S. Patent 2,271,362 but this refractory also has limitations in its tendency to swell and disrupt under oxidizing conditions. Even the combination of as much as 50% $FeO.Cr_2O_3$ with $MgO.Cr_2O_3$ in the system disclosed in my U. S. Patent 2,271,364 did not entirely prevent this swelling in contact with the high FeO slag. On the other hand addition of as much as 50% $FeO.Al_2O_3$ to the good $FeO.Cr_2O_3$ in the sytem disclosed in my U. S. Patent 2,271,365 promotes swelling of this also. It is very surprising therefore that my tests show that mixtures of all three spinels, $FeO.Cr_2O_3$, $MgO.Cr_2O_3$ and $FeO.Al_2O_3$ give a remarkably stable refractory with a minimum of reaction with the slag. The inclusion of the $FeO.Al_2O_3$ decreases the $Cr_2O_3$ necessary and therefore lowers cost. A solid solution of course results when a melt containing oxides in spinel proportions is cooled and the spinels do not have individual existences in the crystal phase. Nor is it essential that the bivalent and trivalent oxides be present in exactly equal molar quantities since an excess of as much as 20% of one or the other can apparently be absorbed by the solid solution. In other words it is sufficient that the moles of trivalent oxide ($Al_2O_3$ and $Cr_2O_3$) lie between 80 and 120% of the moles of bivalent oxide (FeO and MgO). Since both FeO and $Cr_2O_3$ are easily reduced during melting in the presence of carbon electrodes and since MgO volatilizes to some extent, the permissibility of some variation is a distinct advantage. Since excess FeO is harmful to resistance and since $Cr_2O_3$ is the most expensive ingredient, I prefer to calculate spinel proportions for the batch with the result that the product will err on the side of higher $Al_2O_3$ and MgO rather than higher FeO or $Cr_2O_3$. To minimize the reduction to metallic iron I prefer to add the iron oxide as $Fe_2O_3$ or $Fe_3O_4$ while commercial chrome green may be used for $Cr_2O_3$ and a good grade of commercial magnesite for the MgO, the alumina being the chemically pure grade used for metal production by electrolysis. Specimen batches which I have heat cast and tested against the high FeO slag are illustrated in Table I below. The analyses are calculated into approximate spinel proportions as shown in Table II and test results with the high FeO slag are indicated.

TABLE I

Batch composition in per cent by weight

| Melt | $Cr_2O_3$ | $Fe_3O_4$ | MgO | $Al_2O_3$ |
|---|---|---|---|---|
| A | 65 | 35 | | |
| B | 35 | 35 | | 30 |
| C | 80 | | 20 | |
| D | 75 | 15 | 10 | |
| E | | | 28 | 72 |
| F | 30 | | 25 | 45 |
| G | 57 | 18 | 10 | 15 |
| H | 54 | 26 | 5 | 15 |

TABLE II
Calculated proportions in mol percent

| Melt | FeO.Cr₂O₃ | MgO.Cr₂O₃ | FeO.Al₂O₃ | MgO.Al₂O₃ | Slag test |
|---|---|---|---|---|---|
| A | 100 | | | | Good. |
| B | 44 | | 56 | | Poor. |
| C | | 100 | | | Do. |
| D | 47 | 53 | | | Do. |
| E | | | | 100 | Bad. |
| F | | 31 | | 69 | Fair. |
| G | 24 | 48 | 28 | | Do. |
| H | 47 | 24 | 29 | | Good. |

Slag tests were made by mixing 25% by volume slag with the powdered refractory and firing for 7½ hours at 1500° C. The shrinkage and decrease in apparent porosity was taken as an indication of the extent of interaction, while oxidation was indicated by swelling. With pure materials it was found that equally good results were obtained with melt H which has 17% less $Cr_2O_3$ than melt A and subsequent service tests with brick of this composition have given outstanding performance where commercial burnt refractories failed rapidly.

I have also discovered that unlike the results in tests against commercial bottle glass, a certain amount of $SiO_2$ can be tolerated without ruining the resistance to slag despite high FeO content. Good results were obtained when as much as 8% $SiO_2$ was added to ferrous chromite.

The possibility of including $SiO_2$ as well as MgO and $Al_2O_3$ permits the substitution of chrome ore for at least part of the chrome green with a distinct saving in costs. Tests with chrome ore included in the batch have shown however that the $SiO_2$ should still be kept as low as possible. For this reason as well as to permit maximum substitution of the chrome ore for chrome green it is desirable to use a high grade, chemical type of chrome ore. One which I have found suitable analysed 52.55% $Cr_2O_3$, 14.56% (total Fe as) FeO, 15.72% MgO, 11.72% $Al_2O_3$, 1.57% CaO, and 3.31% $SiO_2$.

As it occurs in nature, the primary component of chrome ore is usually considered to be $$FeO.Cr_2O_3$$

but considerable of the FeO is replaced with MgO and considerable of the $Cr_2O_3$ is replaced by $Al_2O_3$ while of even greater importance to its characteristics as a refractory, a gangue is also present in which the following magnesium silicates have been identified in various ores:

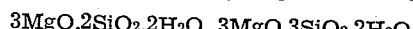
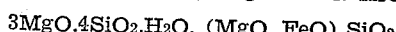
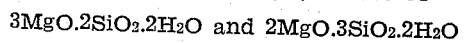

$MgO.SiO_2$, $2MgO.SiO_2$, $2MgO.3SiO_2.4H_2O$ $3MgO.2SiO_2.2H_2O$, $3MgO.3SiO_2.2H_2O$ $3MgO.4SiO_2.H_2O$, $(MgO, FeO).SiO_2$ $3MgO.2SiO_2.2H_2O$ and $2MgO.3SiO_2.2H_2O$ For use in burnt refractories an attempt to stabilize and distribute this gangue is often made by heating the ore to recrystallization temperatures before compounding. Complete recrystallization through fusion has been tried but it was found that the secondary component was generally poorer from the refractory standpoint than when the same ore was recrystallized at a temperature below the fusion point.

When the refractory compositions are completely melted and cast to shape however these considerations are unimportant because the refractory is held together by interlocking crystals rather than by the fluxing matrix as in the burnt refractory. With complete melting it is also possible to adjust the composition to minimize non spinel crystallization. In Table III are listed batches with chrome ore as an ingredient which have all given good tests against the high FeO, low alkaline earth slag.

TABLE III

| Melt | Cr₂O₃ | FeO | MgO | Al₂O₃ | SiO₂ | CaO |
|---|---|---|---|---|---|---|
| J | 20.0 | 25.5 | 8.3 | 44.0 | 1.4 | 0.7 |
| K | 20.0 | 9.5 | 19.4 | 47.9 | 2.0 | 1.1 |
| L | 20.0 | 20.5 | 12.1 | 45.2 | 1.6 | 0.8 |
| M | 38.8 | 33.0 | 1.6 | 24.1 | 2.3 | 0.2 |
| N | 38.6 | 18.2 | 11.4 | 28.1 | 2.4 | 1.2 |
| O | 38.6 | 8.0 | 18.4 | 30.8 | 2.8 | 1.4 |
| P | 52.6 | 14.6 | 15.7 | 11.7 | 3.3 | 1.6 |
| Q | 54.3 | 24.2 | 5.0 | 14.8 | 1.1 | 0.5 |
| R | 57.8 | 30.2 | 1.6 | 7.7 | 2.7 | 0.2 |
| S | 58.1 | 8.0 | 16.5 | 13.3 | 2.7 | 1.4 |
| T | 67.6 | 8.8 | 15.9 | 5.0 | 1.9 | 1.1 |

These batches were made by using the maximum amount of the above chrome ore, adding to it necessary amounts of chrome green, alumina, magnesite or $Fe_3O_4$ (and in one case kyanite) to give the indicated analysis. At the lower $Cr_2O_3$ level the resistance to slag clearly decreased as MgO replaced FeO contrary to the usual teachings for burnt chrome refractories for use against high alkaline earth slags. This effect is so pronounced in fact that substantially equivalent results were obtained on the test for melt J with 20% $Cr_2O_3$ and melt O with 38.6% $Cr_2O_3$, the former being high in FeO and the latter in MgO. With FeO maintained high however, resistance increased as $Cr_2O_3$ increased. Even the 1% of $SiO_2$ in melt Q in comparison with melt H showed a measurable effect on resistance and in general $SiO_2$ should be kept below 5% to gain the full advantage of such batches.

Fig. 1 is the conventional representation by an equilateral tetrahedron of all compositions on a weight per cent basis which exist in the four component system $Cr_2O_3$-MgO-FeO-$Al_2O_3$. The six binary systems, i. e., FeO-$Cr_2O_3$, MgO-$Cr_2O_3$, $Al_2O_3$-$Cr_2O_3$, FeO-$Al_2O_3$, FeO-MgO and MgO-$Al_2O_3$, are represented by compositions along the edges of the tetrahedron. The four ternary systems, i. e., FeO-MgO-$Cr_2O_3$, $Cr_2O_3$-MgO-$Al_2O_3$, $Al_2O_3$-FeO-$Cr_2O_3$ and FeO-MgO-$Al_2O_3$, are represented by compositions on the triangular faces of the tetrahedron. All compositions of four oxides are represented by points within the tetrahedron. Four of the binary systems are between a bivalent oxide and a trivalent oxide and these form spinels ($FeO.Cr_2O_3$, $MgO.Cr_2O_3$, $FeO.Al_2O_3$ and $MgO.Al_2O_3$) at the points indicated on the edges of the tetrahedron. All four ternary systems have solid solutions between two spinels ($FeO.Cr_2O_3$-$MgO.Cr_2O_3$, $MgO.Cr_2O_3$-$MgO.Al_2O_3$, $MgO.Al_2O_3$-$FeO.Al_2O_3$ and $FeO.Al_2O_3$-$FeO.Cr_2O_3$), the compositions of which are represented by points on the straight lines which connect the two spinels on the triangular faces of the tetrahedron. All compositions of four oxides in which the moles of bivalent oxide are equal to the moles of trivalent oxide fall on the shaded plane of Fig. 1 which passes through the four spinel compositions. All compositions which I have found resistant to high FeO, low alkaline earth slag are on, or close to, this plane in composition.

Because only three points are required to fix a plane but four spinels are located on this plane it follows that compositions on the plane can be expressed in more than one way in terms of the spinels present. Actually, since a solid solution occurs between these spinel oxides, description in terms of individual spinels is artificial anyway. Such description has advantages in batch calculation however and for that reason I express my compositions in terms of individual spinels. All compositions in the shaded plane of Fig. 1 are shown on a magnified scale as a spinel tetrahedron in Fig. 2. According to my discoveries it is advantageous to select for a high FeO, low alkaline earth slag, a spinel composition with appreciable percentages of $FeO.Cr_2O_3$ and $FeO.Al_2O_3$ as well as $MgO.Cr_2O_3$ and $MgO.Al_2O_3$. A single composition of FeO, MgO, $Cr_2O_3$ and $Al_2O_3$ can in general be represented by a line in the spinel tetrahedron with its ends in two different faces of the tetrahedron; that is, as long as the moles of bivalent oxide equal the moles of trivalent oxide the quaternary composition can be represented by points in two ternary spinel planes or by those quaternary spinel compositions along a line connecting in the tetrahedron the two ternary compositions.

Thus in Table IV are given the two calculated terminal ternary spinel compositions for such composition lines for the batches in Table III. The calculations ignore the $SiO_2$ and $CaO$ impurities and therefore add up to 100% for visualizing their location in Fig. 2. With the normal amount of annealing given a heat cast refractory, the composition does not crystallize completely and the $SiO_2$ remains as an amorphous matrix containing any impurities and residual amounts of spinel forming oxides.

TABLE IV

| Melt | Per cent $FeO.Cr_2O_3$ | Per cent $MgO.Cr_2O_3$ | Per cent $FeO.Al_2O_3$ | Per cent $MgO.Al_2O_3$ |
| --- | --- | --- | --- | --- |
| J | 30 | 0 | 40 | 30 |
|   | 0 | 26 | 63 | 11 |
| K | 30 | 0 | 0 | 70 |
|   | 0 | 28 | 23 | 49 |
| L | 0 | 26 | 50 | 24 |
|   | 30 | 0 | 26 | 44 |
| M | 59 | 0 | 35 | 6 |
|   | 50 | 8 | 42 | 0 |
| N | 59 | 0 | 0 | 41 |
|   | 0 | 51 | 44 | 5 |
| O | 24 | 31 | 0 | 45 |
|   | 0 | 51 | 19 | 30 |
| P | 42 | 40 | 0 | 18 |
|   | 11 | 66 | 23 | 0 |
| Q | 46 | 26 | 28 | 0 |
|   | 77 | 0 | 4 | 19 |
| R | 87 | 0 | 7 | 6 |
|   | 78 | 8 | 14 | 0 |
| S | 24 | 56 | 0 | 20 |
|   | 0 | 77 | 19 | 4 |
| T | 23 | 70 | 0 | 7 |
|   | 12 | 79 | 9 | 0 |

It is characteristic of these novel compositions that appreciable percentages are in the proportions of $FeO.Cr_2O_3$ and $FeO.Al_2O_3$ and that all four spinel forming oxides are present.

In natural chrome ores, varying amounts of the iron oxide are present as $Fe_2O_3$ and such ores should be considered in a sexenary system with $FeO.Fe_2O_3$ and $MgO.Fe_2O_3$ as components with the other four spinels. In burnt refractories this $Fe_2O_3$ is preserved and in fact some additional $Fe_2O_3$ may be formed during burning by oxidation of part of the FeO. In manufacture of the heat cast refractory in the presence of carbon electrodes however, conditions are reducing and the oxide must be in equilibrium with metallic iron being formed, so that $Fe_2O_3$ originally present is substantially all converted to FeO, keeping the system quaternary. Since $FeO.Fe_2O_3$ is not very refractory this is another advantage of the heat cast refractory over a burnt refractory. While the burnt refractory art teaches that $FeO.Cr_2O_3$ is unstable at elevated temperatures and that it is advantageous to add MgO to convert to $MgO.Cr_2O_3$ and FeO, I have not found heat cast refractories high in $FeO.Cr_2O_3$ especially susceptible to oxidation. I attribute this to the lack of porosity which confines any oxidation attack to the surface alone.

In Table V below I give the mol values of the four major constituents of melts G to T inclusive of the above Tables I and III:

TABLE V

*Millimols in 100 grams of batch*

| Melt | $Cr_2O_3$ | FeO | MgO | $Al_2O_3$ |
| --- | --- | --- | --- | --- |
| G | 375 | 233 | 248 | 147 |
| H | 355 | 337 | 124 | 147 |
| J | 132 | 355 | 206 | 432 |
| K | 132 | 132 | 481 | 470 |
| L | 132 | 285 | 300 | 443 |
| M | 255 | 459 | 40 | 236 |
| N | 254 | 253 | 283 | 276 |
| O | 254 | 111 | 456 | 302 |
| P | 346 | 203 | 389 | 115 |
| Q | 357 | 337 | 124 | 145 |
| R | 380 | 420 | 40 | 76 |
| S | 382 | 111 | 409 | 130 |
| T | 445 | 122 | 394 | 49 |

In the following claims I mean by "principally" over 90% of the total composition of the refractory.

What I claim is:

1. A heat cast refractory composed principally of $Cr_2O_3$, FeO, $Al_2O_3$ and MgO in which the moles of $Cr_2O_3$ plus $Al_2O_3$ lie between 80% and 120% of the moles of FeO plus MgO and in which the FeO is not less than 8%, the MgO not less than 1.5%, the $Cr_2O_3$ not less than 11% and the $Al_2O_3$ not over 50% by weight by chemical analysis and in which the ratio of the mols of MgO to the mols of FeO lies between 0.1 and 4.

2. A heat cast refractory composed principally of $Cr_2O_3$, FeO, $Al_2O_3$ and MgO in which the moles of $Cr_2O_3$ plus $Al_2O_3$ lie between 80% and 120% of the moles of FeO plus MgO and in which the FeO lies between 8% and 38%, the MgO lies between 1.5% and 21%, the $Cr_2O_3$ lies between 11% and 80% and the $Al_2O_3$ lies between 5% and 50% by weight by chemical analysis and in which the ratio of the mols of MgO to the mols of FeO lies between 0.1 and 4.

3. A heat cast refractory composed principally of $Cr_2O_3$, FeO, $Al_2O_3$ and MgO substantially in the proportions of their spinels in which the proportion of $FeO.Cr_2O_3$ lies between 40% and 60%, the proportion of $MgO.Cr_2O_3$ lies between 20% and 40% and the proportion of $FeO.Al_2O_3$ lies between 20% and 40% by weight and in which the iron oxide is in excess of 20% by weight.

4. A heat cast refractory composed principally of $Cr_2O_3$, FeO, $Al_2O_3$, MgO and $SiO_2$ in which the moles of $Cr_2O_3$ plus $Al_2O_3$ lie between 80% and 120% of the moles of FeO plus MgO and in which the FeO is not less than 8%, the MgO is not less than 1.5%, the $Cr_2O_3$ is not less than 11%, the $Al_2O_3$ is not over 50% and the $SiO_2$ is not over 8% by weight by chemical analysis and in which the ratio of the mols of MgO to the mols of FeO lies between 0.1 and 4.

5. A heat cast refractory composed principally of 8–38% FeO, 1.5–21% MgO, 11–80% $Cr_2O_3$, 5–50% $Al_2O_3$ and 0–8% $SiO_2$ by weight and in which the moles of $Cr_2O_3$ plus $Al_2O_3$ lie between 80% and 120% of the moles of FeO plus MgO and in which the ratio of the mols of MgO to the mols of FeO lies between 0.1 and 4.

6. A heat cast refractory composed principally of 1–5% $SiO_2$ and of $Cr_2O_3$, FeO, $Al_2O_3$ and MgO substantially the proportions of their spinels and in which the proportion of $FeO.Cr_2O_3$ lies between 40% and 60%, the proportion of $MgO.Cr_2O_3$ lies between 20% and 40% and the proportion of $FeO.Al_2O_3$ lies between 20% and 40% by weight and in which the iron oxide is in excess of 20% by weight.

THEODORE E. FIELD.